(12) United States Patent
Castillo

(10) Patent No.: US 11,090,998 B2
(45) Date of Patent: Aug. 17, 2021

(54) VEHICLE INCLUDING A FIRST AXLE BEAM AND A SECOND AXLE BEAM COUPLED TOGETHER VIA A LINK

(71) Applicant: GM GLOBAL TECHNOLOGY OPERATIONS LLC, Detroit, MI (US)

(72) Inventor: Brian V. Castillo, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 16/437,544

(22) Filed: Jun. 11, 2019

(65) Prior Publication Data

US 2020/0391566 A1 Dec. 17, 2020

(51) Int. Cl.
*B60G 17/015* (2006.01)
*B60G 99/00* (2010.01)
*B60G 9/02* (2006.01)

(52) U.S. Cl.
CPC ......... *B60G 17/0152* (2013.01); *B60G 9/02* (2013.01); *B60G 99/002* (2013.01)

(58) Field of Classification Search
CPC ..... F41H 7/005; B62D 55/10; B60G 17/0152; B60G 9/02; B60G 9/022; B60G 2200/32; B60G 2200/322; B60G 2206/011; Y10S 901/01
See application file for complete search history.

(56) References Cited

U.S. PATENT DOCUMENTS

| | | | | |
|---|---|---|---|---|
| 3,917,306 A | * | 11/1975 | Madler | B60G 11/08 280/104 |
| 5,080,390 A | * | 1/1992 | Ashworth | B60G 11/02 280/124.135 |
| 5,794,955 A | * | 8/1998 | Flynn | A63C 17/01 280/11.28 |
| 8,594,844 B1 | * | 11/2013 | Gal | F41H 7/005 700/246 |

(Continued)

FOREIGN PATENT DOCUMENTS

FR 748363 A * 7/1933 ............... B60G 9/02

OTHER PUBLICATIONS

Twitter posting from Hendrickson at: https://twitter.com/hend_intl/status/573944677142921216; accessed Feb. 2019; 1 page.

(Continued)

*Primary Examiner* — James A English
(74) *Attorney, Agent, or Firm* — Quinn IP Law

(57) ABSTRACT

A vehicle includes a platform, a first axle beam attached to a front end of the platform at a first pivot, and a second axle beam attached to a rear end of the platform at a second pivot. The first axle beam is rotatable independently of the platform. The second axle beam is rotatable independently of the platform. The vehicle includes a plurality of first wheels fixed to the first axle beam and configured to move the platform. The vehicle includes a plurality of second wheels fixed to the second axle beam and configured to move the platform. The vehicle includes a link attached to one side of the platform at a third pivot. The link is movable about the third pivot independently of the beams to constrain movement of the platform in response to articulation of the first axle beam and/or the second axle beam.

20 Claims, 2 Drawing Sheets

(56) References Cited

U.S. PATENT DOCUMENTS

2004/0195787 A1* 10/2004 Twitchell ............... B62B 13/18
                                                        280/16
2008/0231012 A1*  9/2008 Rach ................. B60G 17/0152
                                                        280/124.112
2012/0259460 A1* 10/2012 Rizzi .................... B62D 57/028
                                                        700/245
2018/0169685 A1*  6/2018 Taylor .................. B05B 13/005

OTHER PUBLICATIONS

Peterson CAT website at: https://www.petersoncat.com/products/new/m-series-motor-graders/24m; accessed Feb. 2019; 20 pages.
Segway of Oakland website at: https://segwayofoakland.com/product/rmp-440-flex-omni/; accessed Feb. 2019; 3 pages.

* cited by examiner

VEHICLE INCLUDING A FIRST AXLE BEAM AND A SECOND AXLE BEAM COUPLED TOGETHER VIA A LINK

INTRODUCTION

Vehicles are typically designed with a suspension system that may provide ride comfort to a passenger of the vehicles as wheels of the vehicle propel the vehicle over a road. Suspension systems also provide terrain conformance as the wheels propel the vehicle over the road. These types of suspension systems may include many mechanical parts to provide both ride comfort and terrain conformance, as well as roll and pitch compliance.

SUMMARY

The present disclosure provides a vehicle including a platform, a first axle beam that is elongated along a first beam axis, and a second axle beam that is elongated along a second beam axis. The platform includes a front end and a rear end opposing the front end. The platform also includes a first side and a second side opposing the first side. The first and second sides are disposed between the front and rear ends. The first axle beam is attached to the front end of the platform at a first pivot. The first axle beam is rotatable about the first pivot independently of the platform. The first beam axis is transverse to the first pivot. The second axle beam is attached to the rear end of the platform at a second pivot. The second axle beam is rotatable about the second pivot independently of the platform. The second beam axis is transverse to the second pivot. The vehicle also includes a plurality of first wheels fixed to the first axle beam such that rotation of the first axle beam about the first pivot is transferred to the first wheels. The first wheels are configured to propel the platform in a direction. The vehicle further includes a plurality of second wheels fixed to the second axle beam such that rotation of the second axle beam about the second pivot is transferred to the second wheels. The second wheels are configured to propel the platform in the direction. The vehicle also includes a link attached to one of the first and second sides of the platform at a third pivot. The link is movable about the third pivot independently of the first and second axle beams to constrain movement of the platform in response to articulation of the first axle beam and/or the second axle beam.

The vehicle optionally includes one or more of the following:

A) the platform is suspended between the first and second axle beams via the first and second pivots such that the platform is rotatable relative to the first and second pivots in response to articulation of the first axle beam and/or the second axle beam;

B) the third pivot is transverse to the first and second pivots;

C) the link is coupled to the first and second axle beams such that rotation of the platform relative to the first and second pivots is limited via the link in response to articulation of the first axle beam and/or the second axle beam;

D) a first connector attached to the first axle beam and the link to couple the link to the first axle beam, and the first connector is pivotable in response to rotation of the link about the third pivot;

E) a second connector attached to the second axle beam and the link to couple the link to the second axle beam, and the second connector is pivotable in response to rotation of the link about the third pivot;

F) the link includes a first end and a second end spaced apart from each other, and the third pivot is disposed between the first and second ends;

G) the first connector is attached to the first end, and the second connector is attached to the second end;

H) the link includes a first tab disposed adjacent to the first end of the link and a second tab disposed adjacent to the second end of the link;

I) the first and second tabs selectively engage the platform to limit the rotation of the platform;

J) the link is rotatable about the third pivot to a maximum distance in a first direction until the first tab abuts the platform which prevents the platform from tilting further;

K) the link is rotatable about the third pivot to a maximum distance in a second direction until the second tab abuts the platform which prevents the platform from tilting further;

L) the first and second directions are opposite each other;

M) the link is rotatable about the third pivot in a first direction until the first tab abuts the platform which stops the platform from tilting further in a first tilt direction to define a first maximum tilt angle relative to one of the first and second pivots;

N) the link is rotatable about the third pivot in a second direction until the second tab abuts the platform which stops the platform from tilting further in a second tilt direction to define a second maximum tilt angle relative to one of the first and second pivots;

O) the first tab abuts the platform when the link rotates the maximum distance about the third pivot in the first direction which stops the platform from tilting further in the first tilt direction to define the first maximum tilt angle relative to one of the first and second pivots;

P) the second tab abuts the platform when the link rotates the maximum distance about the third pivot in the second direction which stops the platform from tilting further in the second tilt direction to define the second maximum tilt angle relative to one of the first and second pivots;

Q) the link is attached to the first side of the platform at the third pivot;

R) the platform is not rotatable about the third pivot;

S) the link is further defined as a first link, and the first link is attached to the first side of the platform at the third pivot;

T) a second link attached to the second side of the platform at a fourth pivot;

U) the fourth pivot is substantially parallel to the third pivot;

V) the second link is movable about the fourth pivot independently of the first and second axle beams;

W) the second link is coupled to the first and second axle beams such that rotation of the platform relative to the first and second pivots is limited via the second link in response to articulation of the first axle beam and/or the second axle beam;

X) the first and second pivots are both disposed axially along a longitudinal axis, and a plane intersects the longitudinal axis;

Y) rotation of the first axle beam to a position in which the first beam axis creates a first beam angle not equal to zero degrees relative to the plane along one of the sides of the platform causes the second axle beam to rotate to a position in which the second beam axis creates a second beam angle that is equal and opposite to the first beam angle relative to the plane along that same side of the platform; and Z) a plurality of electric motors coupled to the respective first and second wheels, and operation of the electric motors causes movement of the first and second wheels respectively which moves the platform in the direction.

The present disclosure provides another vehicle including a platform, a first axle beam that is elongated along a first beam axis, and a second axle beam that is elongated along a second beam axis. The platform includes a front end and a rear end opposing the front end. The platform includes a first side and a second side opposing the first side. The first and second sides are disposed between the front and rear ends. The first axle beam is attached to the front end of the platform at a first pivot. The first axle beam is rotatable about the first pivot independently of the platform. The first beam axis is transverse to the first pivot. The second axle beam is attached to the rear end of the platform at a second pivot. The second axle beam is rotatable about the second pivot independently of the platform. The second beam axis is transverse to the second pivot. The platform is suspended between the first and second axle beams via the first and second pivots such that the platform is rotatable relative to the first and second pivots in response to articulation of the first axle beam and/or the second axle beam. The vehicle also includes a plurality of first wheels fixed to the first axle beam such that rotation of the first axle beam about the first pivot is transferred to the first wheels. The first wheels are movable independently of the first axle beam about the first beam axis to propel the platform in a direction. The vehicle further includes a plurality of second wheels fixed to the second axle beam such that rotation of the second axle beam about the second pivot is transferred to the second wheels. The second wheels are movable independently of the second axle beam about the second beam axis to propel the platform in the direction. The vehicle also includes a link attached to one of the first and second sides of the platform at a third pivot transverse to the first and second pivots. The link is movable about the third pivot independently of the first and second axle beams. The link is coupled to the first and second axle beams such that rotation of the platform relative to the first and second pivots is limited via the link in response to articulation of the first axle beam and/or the second axle beam.

The vehicle optionally includes one or more of the following:

A) a first connector attached to the first axle beam adjacent to one of the first wheels and attached to the link to couple the link and the first axle beam together, and the first connector is pivotable in response to rotation of the link about the third pivot; and B) a second connector attached to the second axle beam adjacent to one of the second wheels and attached to the link to couple the link and the second axle beam together, and the second connector is pivotable in response to rotation of the link about the third pivot.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
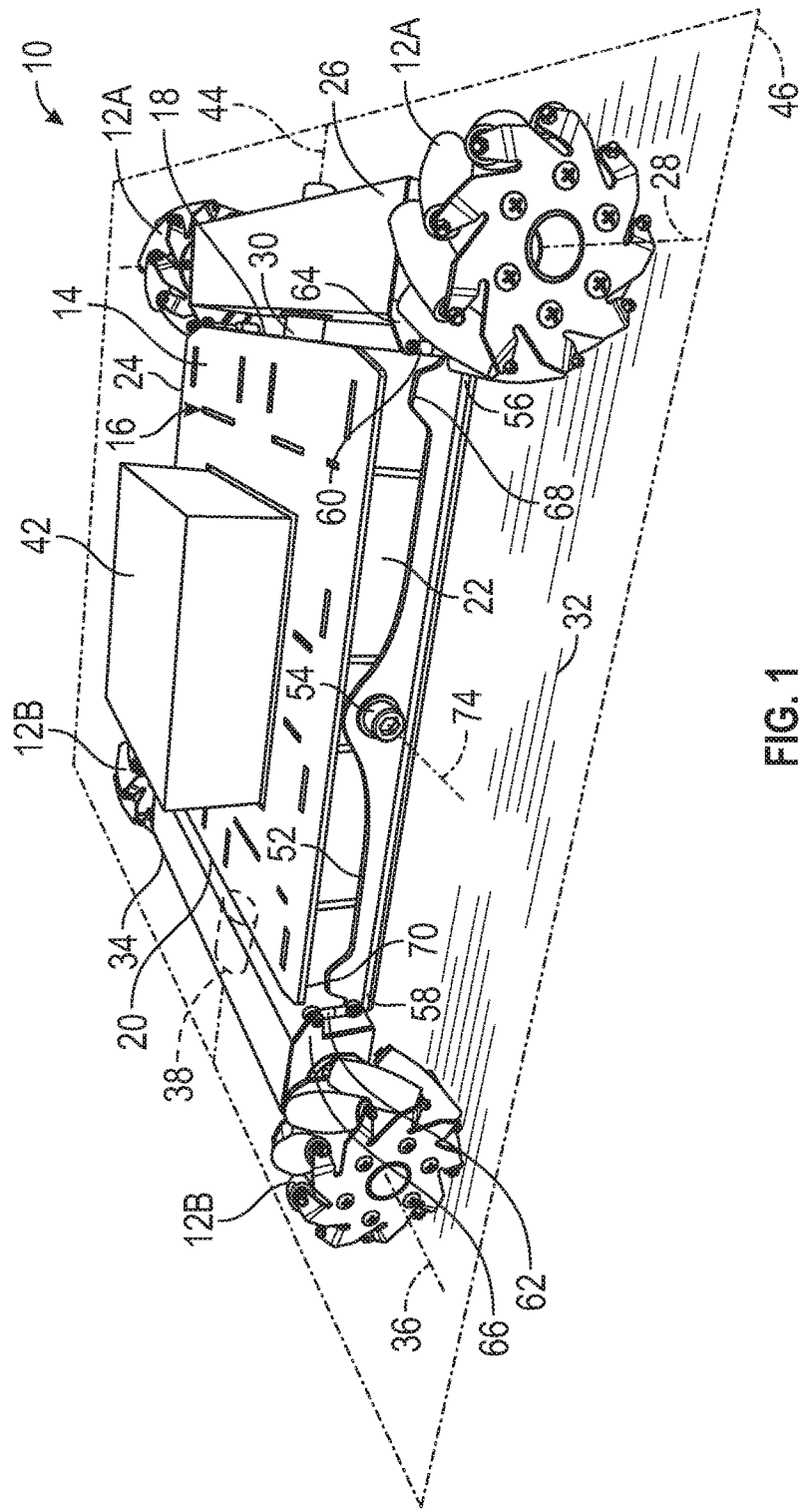
FIG. 1 is a schematic perspective view of a vehicle including a plurality of wheels each contacting a flat surface.

Referring to the FIGS., wherein like numerals indicate like or corresponding parts throughout the several views, a vehicle 10 is generally shown in FIG. 1. The vehicle 10 described herein does not have a suspension system that provides both ride isolation and terrain conformance. In other words, the vehicle 10 does not include a spring and damper type of suspension system. As such, the vehicle 10 described herein does not provide ride isolation. However, the vehicle 10 described herein does provide terrain conformance and roll and pitch stiffness, as well as symmetrically distributed loading of wheels 12A, 12B. Therefore, as non-limiting examples, the vehicle 10 described herein may be used for robots, conveyors, trailers, and other machines/systems where ride isolation is of low priority. Generally, the vehicle 10 uses a system of linked rigid members to equalize loading of the wheels 12A, 12B while also allowing movement of the wheels 12A, 12B, which are described below.

Figure 2:
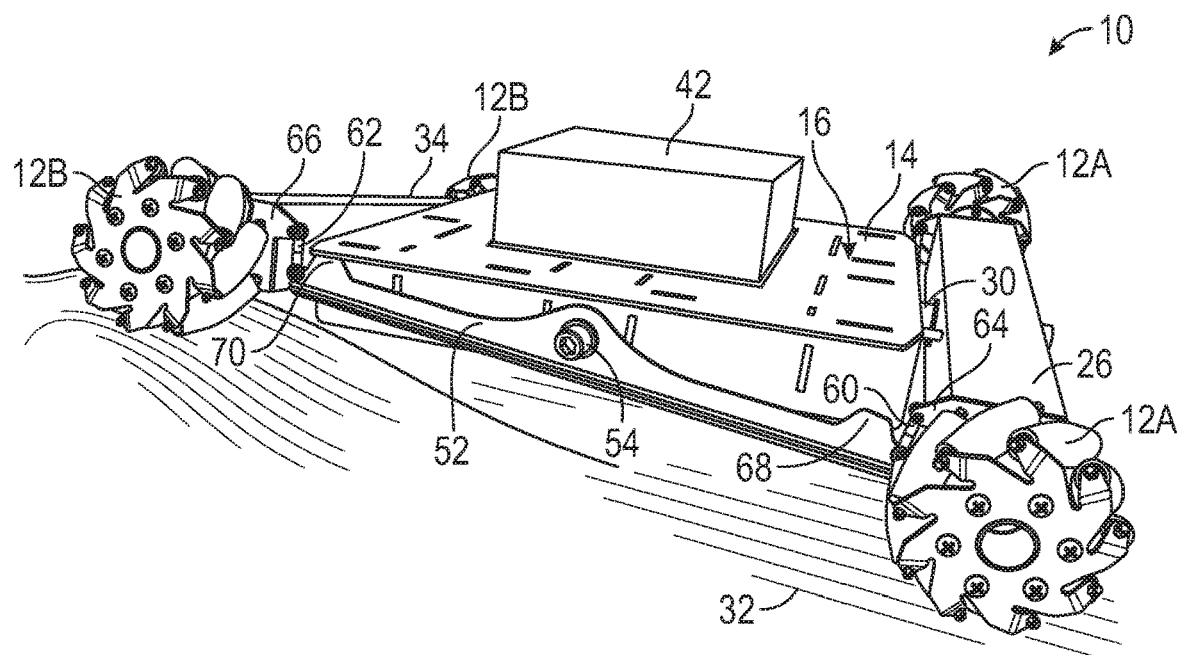
FIG. 2 is a schematic perspective view of the vehicle of FIG. 1 with one of the wheels elevated on a raised surface, and the other wheels contacting the flat surface.

Referring to FIGS. 1 and 2, the vehicle 10 includes a platform 14. The platform 14 may be used to support a load. For example, the load may be cargo that is removable from the platform 14 or the load may be various components fixed to the platform 14, such as one or more cameras, a battery pack, etc. The platform 14 includes a top surface 16 of any suitable configuration for supporting the load.

The platform 14 includes a front end 18 and a rear end 20 opposing the front end 18. Additionally, the platform 14 includes a first side 22 and a second side 24 opposing the first side 22. The first and second sides 22, 24 are disposed between the front and rear ends 18, 20. Therefore, generally, the front end 18, the rear end 20, the first side 22, and the second side 24 cooperate to present an outer periphery of the platform 14.

Continuing with FIGS. 1 and 2, the vehicle 10 also includes a first axle beam 26 that is elongated along a first beam axis 28. The first axle beam 26 is attached to the front end 18 of the platform 14 at a first pivot 30. The first axle beam 26 is rotatable about the first pivot 30 independently of the platform 14. Specifically, the first axle beam 26 may rotate about the first pivot 30 depending on the terrain 32 that the vehicle 10 is travelling across. Generally, the first beam axis 28 is transverse to the first pivot 30.

Furthermore, the vehicle 10 includes a plurality of first wheels 12A that are configured to propel the platform 14 in a direction. The platform 14 may be propelled in any direction, and for example, forward or backward. The first wheels 12A are also fixed to the first axle beam 26 such that rotation of the first axle beam 26 about the first pivot 30 is transferred to the first wheels 12A. Additionally, the first wheels 12A are movable independently of the first axle beam 26 about the first beam axis 28 to propel the platform 14 in the direction.

Continuing with FIGS. 1 and 2, the vehicle 10 further includes a second axle beam 34 that is elongated along a second beam axis 36. The second axle beam 34 is attached to the rear end 20 of the platform 14 at a second pivot 38. The second axle beam 34 is rotatable about the second pivot 38 independently of the platform 14. Specifically, the second axle beam 34 may rotate about the second pivot 38 depending on the terrain 32 that the vehicle 10 is travelling across. Generally, the second beam axis 36 is transverse to the second pivot 38.

Furthermore, depending on the terrain 32, the first and second axle beams 26, 34 are rotatable about the respective first and second pivots 30, 38 independently of each other. The platform 14 shifts in response to movement of the first and second axle beams 26, 34 over the terrain 32 such that the platform 14 remains generally flat, so, for example, that the load does not tip or shift on the platform 14.

Additionally, the vehicle 10 includes a plurality of second wheels 12B that are configured to propel the platform 14 in the direction. Again, the platform 14 may be propelled in any direction. The second wheels 12B are also fixed to the second axle beam 34 such that rotation of the second axle beam 34 about the second pivot 38 is transferred to the second wheels 12B. Furthermore, the second wheels 12B are movable independently of the second axle beam 34 about the second beam axis 36 to propel the platform 14 in the direction.

The configuration of the first and second axle beams 26, 34 and the wheels 12A, 12B provides that the wheels 12A, 12B remain in contact with the terrain 32 during travel. In other words, each and every one of the wheels 12A, 12B remain in contact with the surface of the terrain 32 even if there are irregularities in the surface of the terrain 32. Furthermore, with this configuration, the load is symmetrically distributed across the wheels 12A, 12B of the vehicle 10 even if there are irregularities in the surface of the terrain 32.

The first and second wheels 12A, 12B may be any suitable configuration to propel the vehicle 10. For example, the first and second wheels 12A, 12B may be configured as illustrated in the FIGS., with the wheels 12A, 12B being generally circular wheels having a plurality of angled individual rotatable beads (angled relative to the respective first and second beam axes 28, 36). As other examples, the first and second wheels 12A, 12B may be configured as: tracks, generally circular wheels having a single tread (instead of individual beads), generally circular wheels having a plurality of individual parallel rotatable beads relative to the respective first and second beam axes 28, 36, etc., and combinations thereof. The first wheels 12A may be rotatable about the first beam axis 28, and the second wheels 12B may be rotatable about the second beam axis 36 to propel the platform 14 in the direction, or the first and second wheels 12A, 12B may slide or move in any suitable way to propel the platform 14 in the direction.

Furthermore, the vehicle 10 may be propelled by any suitable manner. For example, the vehicle 10 may be propelled manually or motorized. For manually propelling the vehicle 10, a handle may be secured to the vehicle 10 and used to apply a force to move the vehicle 10 in the desired direction. As another example, if the load is disposed on the platform 14, such as cargo, applying a force to the load may direct and move the vehicle 10 in the desired direction. For motorized propelling of the vehicle 10, a gas-powered machine, a solar-powered machine, an electric machine, which may include one or more electric motors 40, or any other suitable motorized configuration, may be secured to the vehicle 10 to direct and/or move the vehicle 10 in the desired direction.

For example, the vehicle 10 may include a plurality of electric motors 40 (see FIG. 3) coupled to the respective first and second wheels 12A, 12B. Therefore, in certain configurations, one of the electric motors 40 is coupled to each of the respective first and second wheels 12A, 12B. Operation of the electric motors 40 causes movement of the first and second wheels 12A, 12B respectively which propel the platform 14 in the direction. The electric motors 40 may be housing inside the respective first and second axle beams 26, 34. Additionally, the vehicle 10 may include a power source 42 to operate the electric motors 40. The power source 42 may be housed inside, or disposed on, one or more of the first axle beams 26, the second axle beams 34 or the platform 14. The power source 42 may include a battery or any other suitable power to operate the electric motors 40. It is to be appreciated that a wiring harness may be used to electrically connect the power source 42 and the electric motors 40 together. Optionally, the wiring harness may be disposed through the first and second pivots 30, 38.

It is to be appreciated that the first wheels 12A may be connected via an axle inside the first axle beam 26, and one electric motor 40 may be used to drive the axle to move the first wheels 12A, and additionally, the second wheels 12B may be connected via an axle inside the second axle beam 34, and one electric motor 40 may be used to drive the axle to move the second wheels 12B. In this configuration, optionally, one or more differentials may be coupled to the respective axle.

The vehicle 10 may be steered by any suitable manner. The handle discussed above may be used to direct the vehicle 10 in the desired direction, a remote control may be used to control/steer the first and second wheels 12A, 12B, a steering rack may be incorporated between a pair of the wheels 12A, 12B, the force may be applied to the load to direct the vehicle 10 in the desired direction, the electric motors 40 may be actuated in a particular arrangement, etc.

Figure 3:
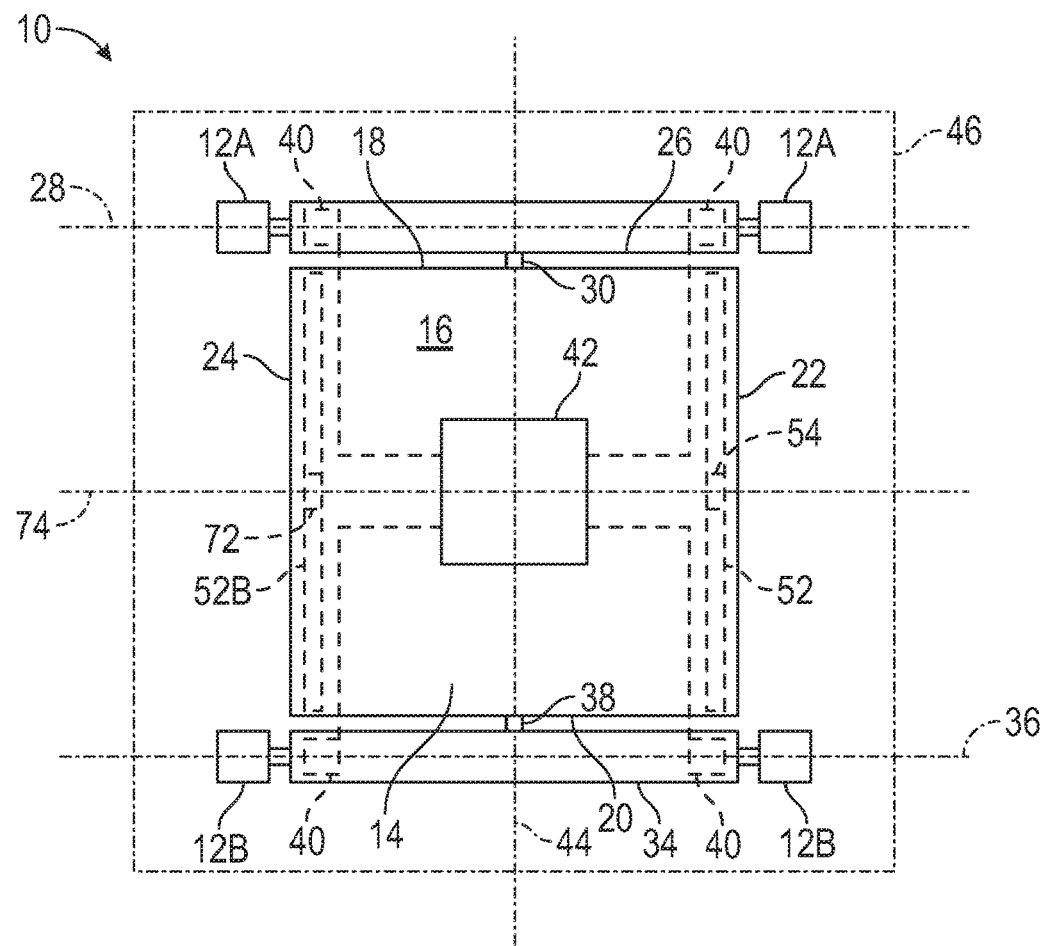
FIG. 3 is a schematic illustration of top view of the vehicle including a platform, a first axle beam, and a second axle beam, with a first pivot relative to the first axle beam, a second pivot relative to the second axle beam, with a longitudinal axis intersecting the first and second pivots, and a pivot axis intersecting the third and fourth pivots.

Referring to FIG. 3, the first and second pivots 30, 38 are both disposed axially along a longitudinal axis 44, and a plane 46 intersects the longitudinal axis 44. In certain configurations, the longitudinal axis 44 intersects both of the first and second pivots 30, 38. As such, the first and second pivots 30, 38 may be concentric relative to the longitudinal axis 44. Therefore, the first and second axle beams 26, 34 may be rotatable about the longitudinal axis 44. Furthermore, the first beam axis 28 and the second beam axis 36 are transverse to the longitudinal axis 44. In certain configurations the first beam axis 28 and the second beam axis 36 are orthogonal to the longitudinal axis 44. In one configuration, the first beam axis 28 and the second beam axis are perpendicular to the longitudinal axis 44.

In certain configurations, the first beam axis 28 is perpendicular to the longitudinal axis 44, and the second beam axis 36 is perpendicular to the longitudinal axis 44. For example, when the vehicle 10 is traveling over flat terrain 32 the first beam axis 28 is substantially parallel to the terrain 32, and the second beam axis 36 is substantially parallel to the terrain 32.

The platform 14 is suspended between the first and second axle beams 26, 34 via the first and second pivots 30, 38 such that the platform 14 is rotatable relative to the first and second pivots 30, 38 in response to articulation of the first axle beam 26 and/or the second axle beam 34. In other words, the platform 14 shifts in response to movement of the first and second axle beams 26, 34 over the terrain 32 such that the platform 14 remains generally flat.

Turning to FIGS. 1 and 2, the vehicle 10 also includes a link 52 attached to one of the first and second sides 22, 24 of the platform 14 at a third pivot 54. The link 52 is movable about the third pivot 54 independently of the first and second axle beams 26, 34. The link 52 is movable to constrain movement of the platform 14 in response to articulation of the first axle beam 26 and/or the second axle beam 34. Additionally, the link 52 is movable to symmetrically distribute the load between the wheels 12A, 12B regardless of whether the terrain 32 is flat, uneven, or irregular. Generally, the third pivot 54 is transverse to the first and second pivots 30, 38. Furthermore, the platform 14 is not rotatable about the third pivot 54. However, the link 52 does move with the movement of the platform 14 (compare FIGS. 1 and 2 where the link 52 rises with the platform 14 in FIG. 2). Optionally, the link 52 may be configured with some flexibility similar to a leaf spring to provide some compliance in the movement of the vehicle 10. Also, optionally, the link 52 may be substantially flat and/or curved.

In certain configurations, the link 52 is attached to the first side 22 of the platform 14 at the third pivot 54. In other configurations, the link 52 is attached to the second side 24 of the platform 14 at the third pivot 54. Additionally, the link 52 is coupled to the first and second axle beams 26, 34 such that rotation of the platform 14 relative to the first and second pivots 30, 38 is limited via the link 52 in response to articulation of the first axle beam 26 and/or the second axle beam 34. As the vehicle 10 travels over irregular terrain 32, the link 52 responds to rotation of the first and second axle beams 26, 34 over the terrain 32. The link 52 may include a first end 56 and a second end 58 spaced apart from each other, and the third pivot 54 is disposed between the first and second ends 56, 58.

Continuing with FIGS. 1 and 2, the vehicle 10 further includes a first connector 60 and a second connector 62 each coupled to the link 52 to prevent the link 52 from binding during rotation of the link 52 relative to the third pivot 54. The first connector 60 is attached to the first axle beam 26 and the link 52 to couple the link 52 to the first axle beam 26. In certain configurations, the first connector 60 is attached to the first axle beam 26 adjacent to one of the first wheels 12A and attached to the link 52 to couple the link 52 and the first axle beam 26 together. The first connector 60 is pivotable in response to rotation of the link 52 about the third pivot 54. The first and second connectors 60, 62 are spaced from the platform 14 such that there is no interference of the first and second connectors 60, 62 with the movement of the first and second axle beams 26, 34 relative to the platform 14.

The second connector 62 is attached to the second axle beam 34 and the link 52 to couple the link 52 to the second axle beam 34. In certain configurations, the second connector 62 is attached to the second axle beam 34 adjacent to one of the second wheels 12B and attached to the link 52 to couple the link 52 and the second axle beam 34 together. The second connector 62 is pivotable in response to rotation of the link 52 about the third pivot 54.

Generally, the first and second connectors 60, 62 are coupled to the first and second axle beams 26, 34 respectively relative to the same side of the platform 14. In certain configurations, the first connector 60 is attached to the first end 56, and the second connector 62 is attached to the second end 58. The first and second connectors 60, 62 are rotatable relative to the respective attachment points to the link 52 and the respective first and second axle beams 26, 34 to prevent binding during rotation of the link 52 about the third pivot 54.

Optionally, the first axle beam 26 may include a first bracket 64 protruding outwardly toward the third pivot 54 and one end of the first connector 60 is attached to the first bracket 64, and another end of the first connector 60 is attached to the link 52. Furthermore, optionally, the second axle beam 34 may include a second bracket 66 protruding outwardly toward the third pivot 54 and one end of the second connector 62 is attached to the second bracket 66, and another end of the second connector 62 is attached to the link 52. Generally, the first and second brackets 64, 66 extend toward each other in a spaced relationship such that the third pivot 54 is disposed between the first and second brackets 64, 66.

Continuing with FIGS. 1 and 2, the link 52 may include a first tab 68 disposed adjacent to the first end 56 of the link 52 and a second tab 70 disposed adjacent to the second end 58 of the link 52. The first and second tabs 68, 70 selectively engage the platform 14 to limit the rotation of the platform 14. The first and second tabs 68, 70 may be any suitable configuration. Generally, a portion of the platform 14 overlaps the first and second tabs 68, 70. Furthermore, in certain configurations, the platform 14 may extend over the entire link 52. The portion of the platform 14 that is disposed over the first and second tabs 68, 70 acts as a stop when the first tab 68 or the second tab 70 engages the respective portion of the platform 14. In certain configurations, the portion of the platform 14 is disposed above the first and second tabs 68, 70, and the first and second tabs 68, 70 protrude outwardly toward the portion of the platform 14. Additionally, in certain configurations, the first connector 60 is attached to the link 52 adjacent to the first tab 68, and the second connector 62 is attached to the link 52 adjacent to the second tab 70.

Figure 4:
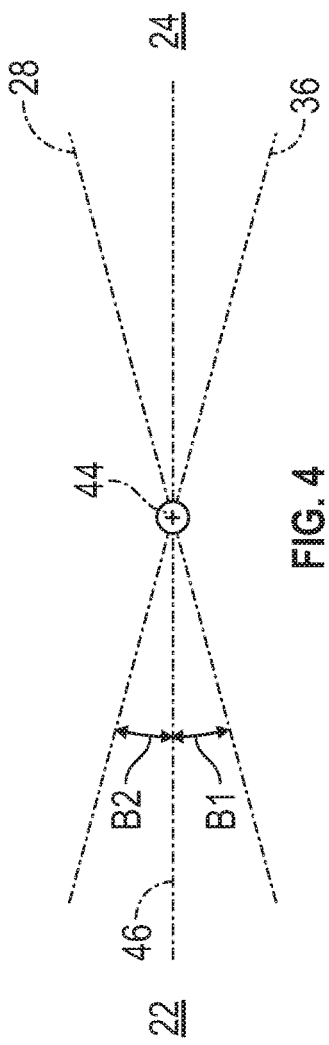
FIG. 4 is a schematic illustration of an end of the vehicle to illustrate the longitudinal axis, a plane that intersects the longitudinal axis, and axes that are along the axle beams.

FIG. 4 may be representative of an example of the first beam axis 28 of the first axle beam 26 and the second beam axis 36 of the second axle beam 34 relative to the sides 22, 24 of the platform 14. Referring to FIGS. 2 and 4, the link 52 is rotatable about the third pivot 54 to a maximum distance in a first direction until the first tab 68 abuts the platform 14 which prevents further tilting of the platform 14. More specifically, the link 52 is rotatable about the third pivot 54 in the first direction until the first tab 68 abuts the platform 14 which stops the platform 14 from tilting further in a first tilt direction to define a first maximum tilt angle relative to one of the first and second pivots 30, 38. Said differently, the first tab 68 abuts the platform 14 when the link 52 rotates the maximum distance about the third pivot 54 in the first direction which stops the platform 14 from tilting further in the first tilt direction to define the first maximum tilt angle relative to one of the first and second pivots 30, 38. In certain configurations, the first maximum tilt angle of the platform 14 is relative to the first pivot 30. Rotation of the first axle beam 26 to a position in which the first beam axis 28 creates a first beam angle B1 not equal to zero degrees relative to the plane 46 along one of the sides 22, 24 of the platform 14 causes the second axle beam 34 to rotate to a position in which the second beam axis 36 creates a second beam angle B2 that is equal and opposite to the first beam angle B1 relative to the plane 46 along the same side 22, 24 of the platform 14.

The link 52 is rotatable about the third pivot 54 to a maximum distance in a second direction until the second tab 70 abuts the platform 14 which prevents further tilting of the platform 14. More specifically, the link 52 is rotatable about the third pivot 54 in the second direction until the second tab 70 abuts the platform 14 which stops the platform 14 from tilting further in a second tilt direction to define a second maximum tilt angle relative to one of the first and second pivots 30, 38. Said differently, the second tab 70 abuts the platform 14 when the link 52 rotates the maximum distance about the third pivot 54 in the second direction which stops the platform 14 from tilting further in the second tilt direction to define the second maximum tilt angle relative to one of the first and second pivots 30, 38. In certain configurations, the second maximum tilt angle is relative to the first pivot 30. Furthermore, the first and second directions are opposite each other. Rotation of the second axle beam 34 to a position in which the second beam axis 36 creates the second beam angle B2 not equal to zero degrees relative to the plane 46 along one of the sides 22, 24 of the platform 14 causes the first axle beam 26 to rotate to a position in which the first beam axis 28 creates the first beam angle B1 that is equal and opposite to the second beam angle B2 relative to the plane 46 along the same side 22, 24 of the platform 14.

As an example, FIG. 2 illustrates one of the wheels 12B of the second axle beam 34 relative to the first side 22 of the platform 14 being elevated. Having this wheel 12B elevated causes the second axle beam 34 to create the second beam angle B2 relative to the plane 46 along the first side 22 of the platform 14; accordingly, the wheel 12A of the first axle beam 26 relative to the same side of the platform 14 (in this example, the first side 22 is the same side) causes the first axle beam 26 to create the first beam angle B1 equal and opposite to the second beam angle B2 relative to the plane 46 along the first side 22 of the platform 14 (this example may also be represented via FIG. 4).

The first direction that the link 52 moves may be counterclockwise and the second direction that the link 52 moves may be clockwise, or vice versa. For example, movement of one of the first wheels 12A over a protrusion in the terrain 32 causes the first axle beam 26 to rotate about the longitudinal axis 44 which causes the link 52 to rotate about the third pivot 54 due to the connection at the first connector 60, and this movement of the link 52 is transferred to the second axle beam 34 via the connection at the second connector 62; thus, rotating the second axle beam 34 about the longitudinal axis 44 in an opposite direction from the first axle beam 26. FIG. 2 illustrates one of the second wheels 12B moving over a protrusion in the terrain 32. Therefore, generally, when traveling over rough terrain 32, the first and second axle beams 26, 34 are always at an equal and opposite angle to each other relative to the plane 46. Having the first and second axle beams 26, 34 are always at an equal and opposite angle to each other provides that each and every wheel 12A, 12B remain in contact with the terrain 32 as well as provides symmetrically distributed loading to each of the wheels 12A, 12B.

In certain configurations, more than one link 52, 52B may be used. In this configuration, the link 52 is further defined as a first link 52, and the vehicle 10 further includes a second link 52B. Therefore, the second link 52B is optional, and the optional second link 52B is schematically shown in FIG. 3.

Generally, the first and second links 52, 52B are disposed on opposite sides 22, 24 of the platform 14. Therefore, for example, the first link 52 may be attached to the first side 22 of the platform 14 at the third pivot 54, and the second link 52B may be attached to the second side 24 of the platform 14 at a fourth pivot 72. The fourth pivot is substantially parallel to the third pivot 54. In certain configurations, the third and/or fourth pivots 54, 72 may be concentric relative to a pivot axis 74. In one configuration, the third and fourth pivots 54, 72 may be coaxial with the pivot axis 74. Additionally, the pivot axis 74 may be parallel to the plane 46. Therefore, the plane 46 may be horizontal.

The second link 52B is movable about the fourth pivot 72 independently of the first and second axle beams 26, 34. The second link 52B is coupled to the first and second axle beams 26, 34 such that rotation of the platform 14 relative to the first and second pivots 30, 38 is limited via the second link 52B in response to articulation of the first axle beam 26 and/or the second axle beam 34. The first link 52, the first and second connectors 60, 62 and corresponding features as illustrated in FIGS. 1 and 2 may be duplicated on the opposite side of the platform 14 for the second link 52B. Therefore, the above discussion applies to the second link 52B, and will not be repeated. By incorporating two links 52, 52B, the load applied to one single link 52 is reduced. In other words, the load is shared across both of the links 52, 52B instead of one link 52 incurring the entire load by itself.

The link(s) 52, 52B and the first and second connectors 60, 62 cooperate with the platform 14 and the first and second axle beams 26, 34 to provide roll and pitch stiffness which provides stability to the platform 14 as well as terrain conformance via each and every one of the wheels 12A, 12B remaining in contact with the terrain 32 during travel. Due to the rigid configuration of the link(s) 52, 52B and the first and second axle beams 26, 34, the platform 14 has a high roll stiffness, and minimal pitch rotation. The vehicle 10 arrangement described herein provides a simpler way to assemble the vehicle 10 as compared to vehicles with the suspension system as discussed in the introduction. Additionally, the vehicle arrangement described herein provides a cost savings due to a reduced number of parts, less complexity, and easier assembly as compared to vehicles with the suspension system as discussed in the introduction.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A vehicle comprising:
   a platform including a front end and a rear end opposing the front end, and the platform including a first side and a second side opposing the first side, and wherein the first and second sides are disposed between the front and rear ends;
   a first axle beam that is elongated along a first beam axis, and the first axle beam is attached to the front end of the platform at a first pivot, and wherein the first axle beam is rotatable about the first pivot independently of the platform, and the first beam axis is transverse to the first pivot;

a second axle beam that is elongated along a second beam axis, and the second axle beam is attached to the rear end of the platform at a second pivot, and wherein the second axle beam is rotatable about the second pivot independently of the platform, and the second beam axis is transverse to the second pivot;

a plurality of first wheels fixed to the first axle beam such that rotation of the first axle beam about the first pivot is transferred to the first wheels, and wherein the first wheels are configured to propel the platform in a direction;

a plurality of second wheels fixed to the second axle beam such that rotation of the second axle beam about the second pivot is transferred to the second wheels, and wherein the second wheels are configured to propel the platform in the direction;

a link attached to one of the first and second sides of the platform at a third pivot, and wherein the link is movable about the third pivot independently of the first and second axle beams to constrain movement of the platform in response to articulation of the first axle beam and/or the second axle beam; and a first connector attached to the first axle beam and the link to couple the link to the first axle beam, and the first connector is pivotable in response to rotation of the link about the third pivot.

2. The vehicle as set forth in claim 1 wherein:
the platform is suspended between the first and second axle beams via the first and second pivots such that the platform is rotatable relative to the first and second pivots in response to articulation of the first axle beam and/or the second axle beam;

the third pivot is transverse to the first and second pivots; and the link is coupled to the first and second axle beams such that rotation of the platform relative to the first and second pivots is limited via the link in response to articulation of the first axle beam and/or the second axle beam.

3. The vehicle as set forth in claim 2 further including a second connector attached to the second axle beam and the link to couple the link to the second axle beam, and the second connector is pivotable in response to rotation of the link about the third pivot.

4. The vehicle as set forth in claim 1 further including a second connector attached to the second axle beam and the link to couple the link to the second axle beam, and the second connector is pivotable in response to rotation of the link about the third pivot.

5. The vehicle as set forth in claim 4 wherein the link includes a first end and a second end spaced apart from each other, and the third pivot is disposed between the first and second ends, and wherein the first connector is attached to the first end, and the second connector is attached to the second end.

6. The vehicle as set forth in claim 5 wherein the link includes a first tab disposed adjacent to the first end of the link and a second tab disposed adjacent to the second end of the link, and wherein the first and second tabs selectively engage the platform to limit the rotation of the platform.

7. The vehicle as set forth in claim 6 wherein:
the link is rotatable about the third pivot to a maximum distance in a first direction until the first tab abuts the platform which prevents further tilting of the platform;

the link is rotatable about the third pivot to a maximum distance in a second direction until the second tab abuts the platform which prevents further tilting of the platform; and the first and second directions are opposite each other.

8. The vehicle as set forth in claim 6 wherein:
the link is rotatable about the third pivot in a first direction until the first tab abuts the platform which stops the platform from tilting further in a first tilt direction to define a first maximum tilt angle relative to one of the first and second pivots;

the link is rotatable about the third pivot in a second direction until the second tab abuts the platform which stops the platform from tilting further in a second tilt direction to define a second maximum tilt angle relative to one of the first and second pivots; and the first and second directions are opposite each other.

9. The vehicle as set forth in claim 1 wherein:
the link includes a first end and a second end spaced apart from each other, and the third pivot is disposed between the first and second ends;

the link includes a first tab disposed adjacent to the first end of the link and a second tab disposed adjacent to the second end of the link; and the first and second tabs selectively engage the platform to limit the rotation of the platform.

10. The vehicle as set forth in claim 9 wherein:
the first tab abuts the platform when the link rotates a maximum distance about the third pivot in a first direction which stops the platform from tilting further in a first tilt direction to define a first maximum tilt angle relative to one of the first and second pivots; and the second tab abuts the platform when the link rotates a maximum distance about the third pivot in a second direction which stops the platform from tilting further in a second tilt direction to define a second maximum tilt angle relative to one of the first and second pivots.

11. The vehicle as set forth in claim 1 wherein the link is attached to the first side of the platform at the third pivot, and wherein the platform is not rotatable about the third pivot.

12. The vehicle as set forth in claim 11:
wherein the link is further defined as a first link, and the first link is attached to the first side of the platform at the third pivot;

further including a second link attached to the second side of the platform at a fourth pivot; and wherein the fourth pivot is substantially parallel to the third pivot.

13. The vehicle as set forth in claim 12 wherein:
the second link is movable about the fourth pivot independently of the first and second axle beams; and the second link is coupled to the first and second axle beams such that rotation of the platform relative to the first and second pivots is limited via the second link in response to articulation of the first axle beam and/or the second axle beam.

14. The vehicle as set forth in claim 1 wherein:
the first and second pivots are both disposed axially along a longitudinal axis, and a plane intersects the longitudinal axis; and rotation of the first axle beam to a position in which the first beam axis creates a first beam angle not equal to zero degrees relative to the plane along one of the sides of the platform causes the second axle beam to rotate to a position in which the second beam axis creates a second beam angle that is equal and opposite to the first beam angle relative to the plane along that same side of the platform.

15. The vehicle as set forth in claim 1 further including a plurality of electric motors coupled to the respective first and second wheels, and operation of the electric motors causes movement of the first and second wheels respectively which propel the platform in the direction.

16. The vehicle as set forth in claim 1 wherein
the platform is suspended between the first and second axle beams via the first and second pivots such that the platform is rotatable relative to the first and second pivots in response to articulation of the first axle beam and/or the second axle beam;
the first wheels are movable independently of the first axle beam about the first beam axis to propel the platform in the direction;
the second wheels are movable independently of the second axle beam about the second beam axis to propel the platform in the direction;
the third pivot is transverse to the first and second pivots; and
the link is coupled to the first and second axle beams such that rotation of the platform relative to the first and second pivots is limited via the link in response to articulation of the first axle beam and/or the second axle beam.

17. The vehicle as set forth in claim 16 wherein the first connector is attached to the first axle beam adjacent to one of the first wheels.

18. The vehicle as set forth in claim 17 further including a second connector attached to the second axle beam adjacent to one of the second wheels and attached to the link to couple the link and the second axle beam together, and the second connector is pivotable in response to rotation of the link about the third pivot.

19. A vehicle comprising:
a platform including a front end and a rear end opposing the front end, and the platform including a first side and a second side opposing the first side, and wherein the first and second sides are disposed between the front and rear ends;
a first axle beam that is elongated along a first beam axis, and the first axle beam is attached to the front end of the platform at a first pivot, and wherein the first axle beam is rotatable about the first pivot independently of the platform, and the first beam axis is transverse to the first pivot;
a second axle beam that is elongated along a second beam axis, and the second axle beam is attached to the rear end of the platform at a second pivot, and wherein the second axle beam is rotatable about the second pivot independently of the platform, and the second beam axis is transverse to the second pivot;
a plurality of first wheels fixed to the first axle beam such that rotation of the first axle beam about the first pivot is transferred to the first wheels, and wherein the first wheels are configured to propel the platform in a direction;
a plurality of second wheels fixed to the second axle beam such that rotation of the second axle beam about the second pivot is transferred to the second wheels, and wherein the second wheels are configured to propel the platform in the direction;
a link attached to one of the first and second sides of the platform at a third pivot, and wherein the link is movable about the third pivot independently of the first and second axle beams to constrain movement of the platform in response to articulation of the first axle beam and/or the second axle beam;
wherein the link includes a first end and a second end spaced apart from each other, and the third pivot is disposed between the first and second ends;
wherein the link includes a first tab disposed adjacent to the first end of the link and a second tab disposed adjacent to the second end of the link; and
wherein the first and second tabs selectively engage the platform to limit the rotation of the platform.

20. A vehicle comprising:
a platform including a front end and a rear end opposing the front end, and the platform including a first side and a second side opposing the first side, and wherein the first and second sides are disposed between the front and rear ends;
a first axle beam that is elongated along a first beam axis, and the first axle beam is attached to the front end of the platform at a first pivot, and wherein the first axle beam is rotatable about the first pivot independently of the platform, and the first beam axis is transverse to the first pivot;
a second axle beam that is elongated along a second beam axis, and the second axle beam is attached to the rear end of the platform at a second pivot, and wherein the second axle beam is rotatable about the second pivot independently of the platform, and the second beam axis is transverse to the second pivot;
a plurality of first wheels fixed to the first axle beam such that rotation of the first axle beam about the first pivot is transferred to the first wheels, and wherein the first wheels are configured to propel the platform in a direction;
a plurality of second wheels fixed to the second axle beam such that rotation of the second axle beam about the second pivot is transferred to the second wheels, and wherein the second wheels are configured to propel the platform in the direction;
a link attached to one of the first and second sides of the platform at a third pivot, and wherein the link is movable about the third pivot independently of the first and second axle beams to constrain movement of the platform in response to articulation of the first axle beam and/or the second axle beam; and
wherein the link is attached to the first side of the platform at the third pivot, and wherein the platform is not rotatable about the third pivot.

* * * * *